United States Patent [19]

Turner

[11] Patent Number: 5,339,311

[45] Date of Patent: * Aug. 16, 1994

[54] DATA PACKET RESEQUENCER FOR A HIGH SPEED DATA SWITCH

[75] Inventor: Jonathan S. Turner, St. Louis, Mo.

[73] Assignee: Washington University, St. Louis, Mo.

[*] Notice: The portion of the term of this patent subsequent to Nov. 9, 2000 has been disclaimed.

[21] Appl. No.: 5,587

[22] Filed: Jan. 19, 1993

Related U.S. Application Data

[63] Continuation of Ser. No. 663,100, Mar. 1, 1991, Pat. No. 5,260,935.

[51] Int. Cl.[5] .............................................. H04L 12/56
[52] U.S. Cl. ........................................ 370/60; 370/94.1
[58] Field of Search ...................... 370/60, 60.1, 94.1, 370/94.2, 58.1, 58.2, 58.3, 170.1

[56] References Cited

U.S. PATENT DOCUMENTS 5,127,000  6/1992  Henrion ................................. 370/60
5,173,897  12/1992  Schrodi et al. ....................... 370/60
5,253,251  10/1993  Aramaki ................................. 370/60

*Primary Examiner*—Wellington Chin
*Attorney, Agent, or Firm*—Rogers, Howell & Haferkamp

[57] ABSTRACT

A resequencing buffer and buffer control circuit is disclosed for resequencing data packets into their timed sequence after traversing a switch fabric which can introduce a misordering of data packets because of the varying time intervals required for data packets to traverse the switch fabric in a non-blocking manner. The resequencing buffer controller includes a plurality of bi-directional shift registers for storing each data packet's age and slot number, each bi-directional shift register having an associated slot control circuit for feeding the age and slot number one bit at a time onto a contention bus to thereby determine the oldest data packet eligible for transmission. The contention bus is an exclusive OR wire bus which interconnects the slot control circuits and an output circuit which controls the buffer to output the slot number containing the data packet of oldest age. In the event of ties between data packets having the same age, the slot numbers of the buffer are used to select a data packet for transmission.

3 Claims, 6 Drawing Sheets

DATA PACKET RESEQUENCER FOR A HIGH SPEED DATA SWITCH

GOVERNMENT RIGHTS

This invention was made with Government support under Grant No. NCR 8914396 awarded by the National Science Foundation. The Government has certain rights in the invention.

This is a continuation of copending application Ser. No. 07/633,100 filed on Mar. 1, 1991, now U.S. Pat. No. 5,260,935.

BACKGROUND AND SUMMARY OF THE INVENTION

High speed data switching systems, including ATM switching systems, are characterized by switches which have switching fabrics or other routing mechanisms for redirecting the flow of data packets from a plurality of inputs to a plurality of outputs. It is not uncommon for incoming data packets to pass through a switching fabric along different paths in accordance with one of many methodologies designed to reliably route those data packets to their proper destination with minimal blocking. Because of the varying time that a particular data packet may take to traverse the routing network, it is not uncommon for data packets to appear at the outputs in a sequence different from their sequence at the input side. This unintentional reordering of packets in an unpredictable fashion can cause problems in some applications which require that the same sequence in data be preserved.

In order to solve the sequencing problem inherently present in high speed data switches which misorder data packets, the inventor herein has succeeded in designing and developing a resequencer for a packet processor I/C which reorders the data packets into their proper time sequence after exiting the switching fabric and prior to transmission to the next switching system on the path to the ultimate destination. With the resequencer of the present invention, data packets may be replaced in proper order for all but a vanishingly small fraction of misordered packets while introducing only a very small delay. For example, the inventor estimates that for a 64 port switch, packets may be delayed between about 15-20 packet times to ensure a misordering probability of less than $10^{-6}$.

The resequencer of the present invention includes a resequencer buffer which receives the data packets after they exit from the switch, and its associated buffer controller which controls the buffer to output the data packets in time sequence as opposed to the strict sequence in which they are received from the switch. Additionally, a time stamp circuit at the input side of the switch stamps the data packets with the current time as they enter the switch. Therefore, as the data packets exit the switch, they contain a time stamp representative of their sequence as they entered the switch. As the data packet exits the switch and enters the resequencing buffer, its time stamp is compared with the then current time to generate a delta T which is equivalent to the time lapse for that particular packet to traverse the switch. This delta T equates to the "age" of the packet. The packets are then stored in the slots of the buffer and a corresponding entry is made in the buffer controller of the slot number and the age for each data packet. These ages are regularly incremented so that as a data packet sits in the buffer, its age remains representative of the delta T from the time that the data packet entered the switch. The buffer controller then compares the ages of all of the data packets in order to determine the oldest data packet contained in the buffer. This age is then compared with an age threshold and, if it is sufficiently old, indicates that the data packet is available for transmission. Additional output circuitry of conventional design then either grants or denies the request to transmit and the data packet is transmitted.

The buffer controller provides many unique advantages in its approach to resequencing the data packets. The first of these is that the buffer controller works with a delta T representative of the age of the data packet computed as the time required for that data packet to traverse the switch. Therefore, time is used to determine the sequencing of the data packets so that they are reordered in real time sequence. Still another feature of the buffer controller is the technique of storing the data packets in a buffer until an appropriate age threshold has been reached. This provides a second level of control over the data packets in that the data packets are not merely spewed out of the switch in an approximated reordered sequence but instead are output in a controlled manner. Furthermore, adjustment of the age threshold may also be used to increase the reliability of resequencing. Still another advantage of the buffer controller is its use of a wire OR contention bus which interconnects a plurality of bi-directional shift registers (BSRs), each BSR being used to contain a data packet's age and slot number. This circuitry provides an elegantly simple means for comparing the ages and slot numbers of the data packets in order to select the oldest packet for potential output. This wire OR contention bus circuitry permits cascading of a number of groups of BSRs in order to facilitate contention between a larger number of data packets than would be possible in a single grouping, because of capacitive loading. Still another advantage to the buffer controller of the present invention is that it uses bi-directional shift registers for storing the age and slot number such that the slot numbers themselves may be used to break ties between data packets which are of equal age. This conveniently prevents blocking of the buffer controller by data packets of equal age and eliminates the requirement for additional circuitry for making additional comparisons or using some other technique for resolving ties.

While the principal advantages and features of the invention have been briefly described above, a more thorough understanding may be attained by referring to the drawings and description of the preferred embodiment which follow.

DETAILED DESCRIPTION OF THE PREFERRED EMBODIMENT

Figure 1:
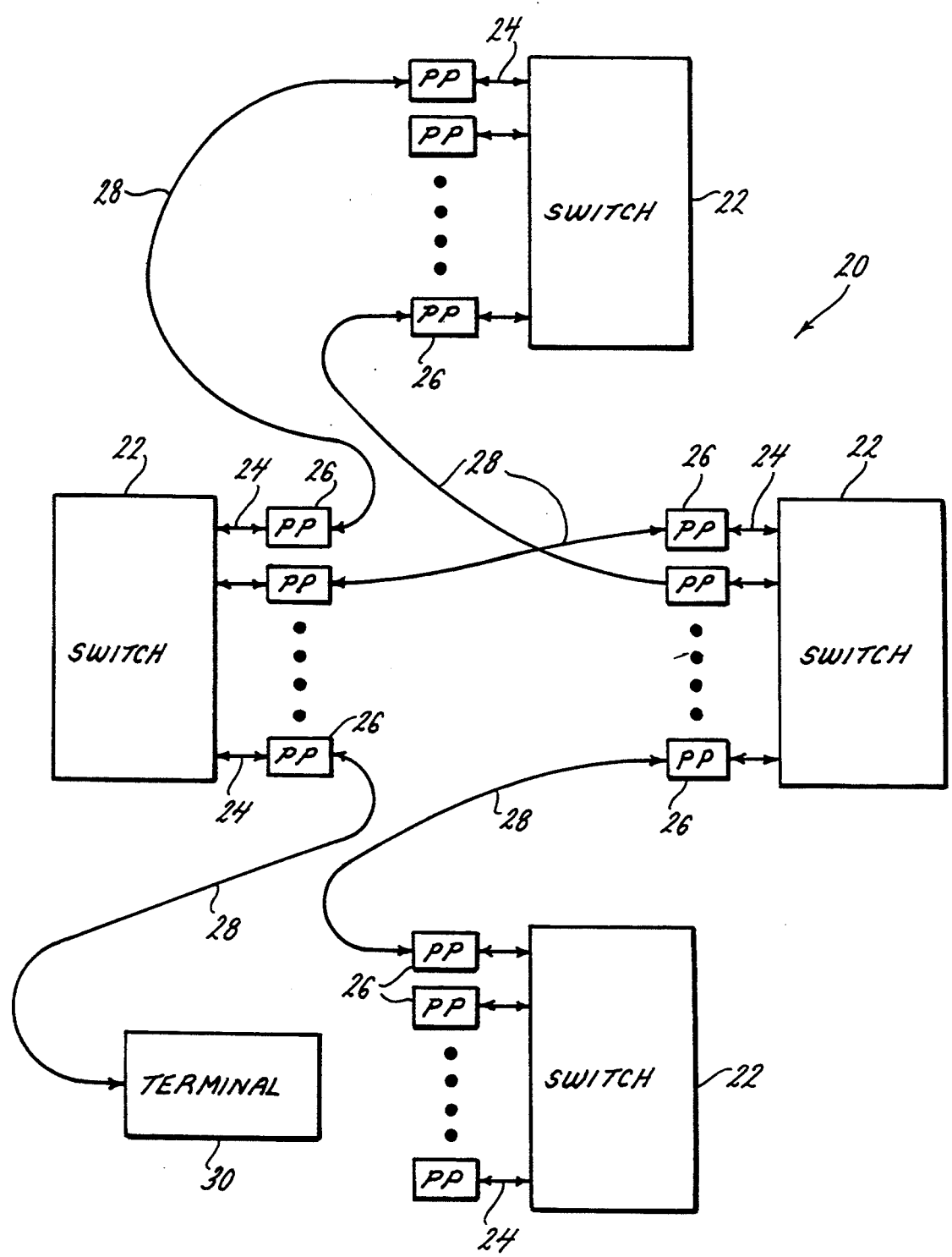
FIG. 1 is a block diagram representative of a sample high speed data packet switching network.

As shown in FIG. 1, a typical high speed data network 20 includes a plurality of switches 22 each of which has a plurality of I/O ports 24 with an associated packet processor 26 which interfaces between the data links 28 and the I/O ports 24. Data links 28 may be high speed data links such as fiber optic links or the like. The switches 22 serve to route the data packets to their intended destination which, for purposes of illustration, is shown as a data terminal 30. Typically, a plurality of such terminals 30 or other end users of data are connected to the high speed data network 20 as well as one or more sources for data (not shown). Thus, with the high speed data network 20, data packets may be rapidly transmitted and routed from one or more data source to one or more data destinations. The high speed data net-work 20 as shown in FIG. 1 has many applications and an example is included in the present disclosure only for purposes of illustrating the environment of the present invention.

Figure 2:
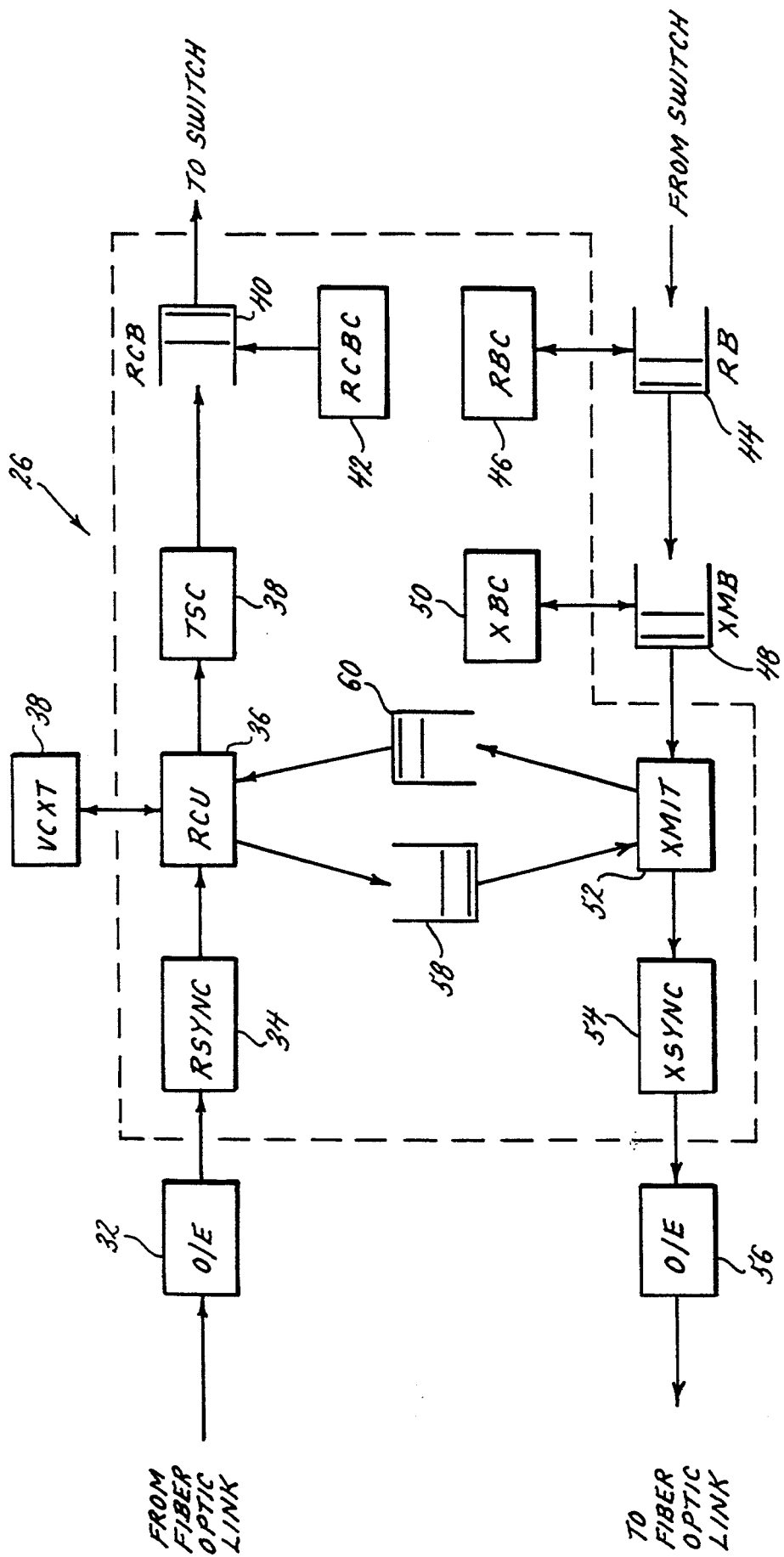
FIG. 2 is a block diagram of a typical packet processor which interfaces a high speed switch with a network.

The packet processors 26 are shown, again in exemplary manner, in FIG. 2 in block diagram form and typically include an optical to electrical encoder 32 for converting the data packets from optical to electrical format, and the data packets are then processed through a receiver synchronizer 34 to a receiver unit 36 which accesses a virtual circuit translator 38 for translating the routing information associated with each data packet. The data packets are then routed to a time stamp circuit 38 where they are stamped with the current time and then to a receiver buffer 40 controlled by a receiver buffer control 42 which parcels the data packets to the switch 22 (see FIG. 1). This describes the input processing of data packets from the fiber optic high speed data links 28 to the switch 22.

Data packets returning from the switch 22 are first accumulated in a resequencing buffer 44 as controlled by a resequencing buffer controller 46 which forms the subject matter of the present invention. This resequencing buffer 44 and control 46 reorders the data packets into their timed sequence, as is explained in greater detail, infra. The data packets are then parceled into a transmit buffer 48 controlled by a transmit buffer controller 50 for transmission by transmitter 52 through a transmit synchronizing circuit 54 and an electrical to optical encoder 56 back onto the high speed data links 28. A pair of buffers 58, 60 directly interface between receiver 36 and transmitter 52 for circuit testing and other purposes, as is known in the art. As noted above, the resequencing buffer 44 and the resequencing buffer controller 46 operate in conjunction with the time stamp circuit 38 to determine the age of each data packet as it exits switch 22 and then reorder those data packets for output in time sequence.

Figure 3:
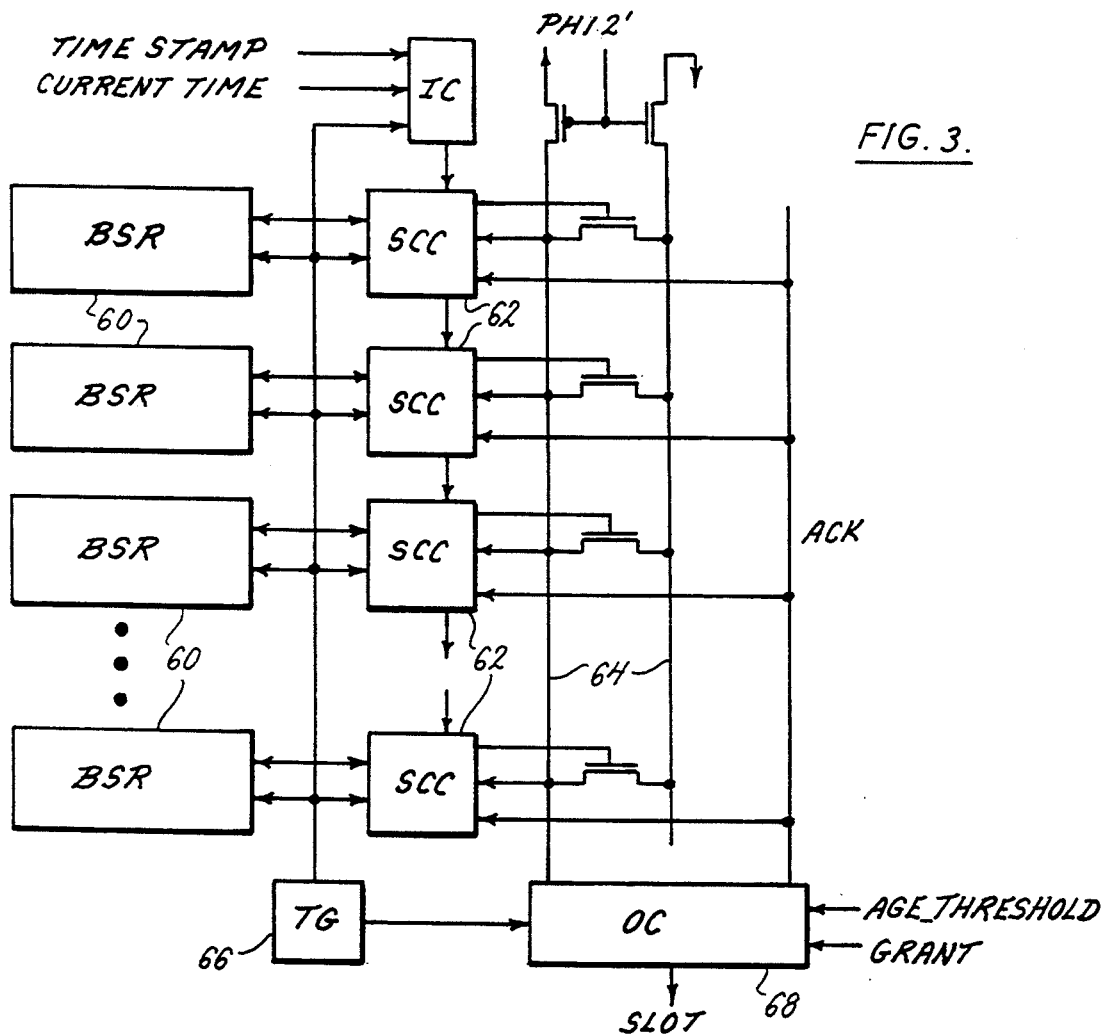
FIG. 3 is a block diagram of a buffer controller.
Figure 4:
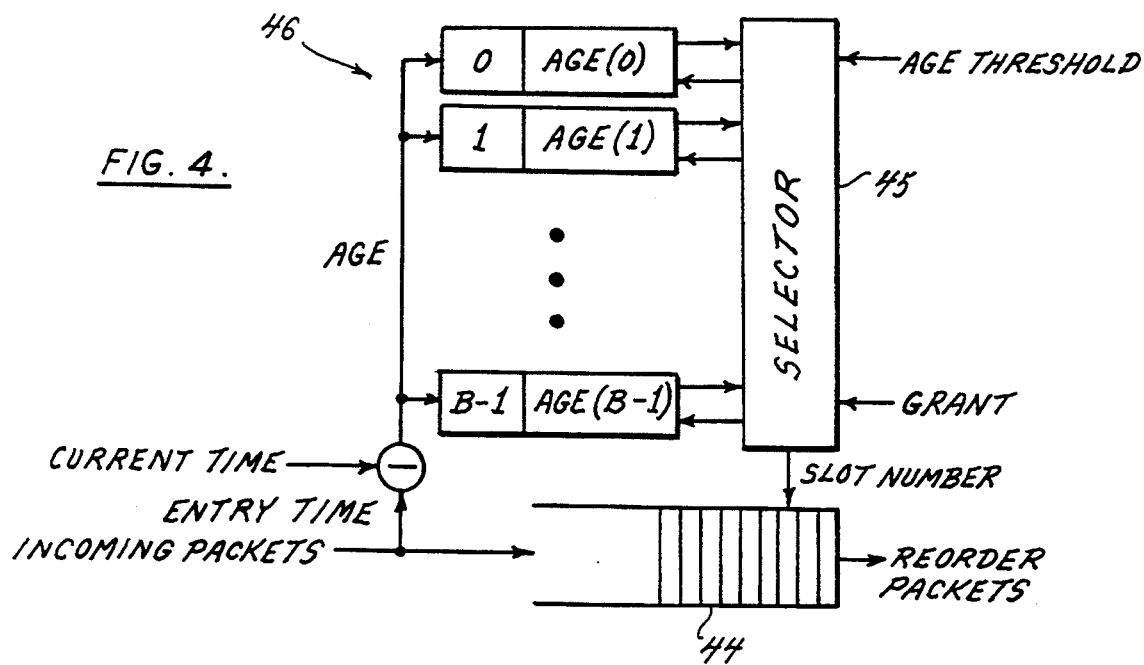
FIG. 4 is a block diagram detailing data flow in a buffer controller.

The buffer controller 46 is shown in greater detail and can be explained by referring to FIGS. 3 and 4. First of all, referring to FIG. 4, incoming data packets have a time stamp representative of their time of entry into the switch 22 which is compared with the current time to generate an age, the age then being stored along with an associated slot number, the slot number being that position in the resequencing buffer 44 where the data packet is stored. Thus, a plurality of data packets are stored in a plurality of slots in resequencing buffer 44 and a corresponding plurality of paired groupings of age number and slot number are stored in the buffer controller 46. These age numbers and slot numbers are compared by a selection circuit 45 to determine which data packet is the oldest data packet and, hence, the next in time ordered sequence for transmission. For data packets of the same age, the slot numbers are used to break the tie. Once the data packet for transmission has been selected, its age is compared with an age threshold and if sufficiently old, and permission is given for transmission to the transmitter buffer, a grant signal is received by the selector circuit 45 and the selected data packet is then transmitted to the transmitter buffer.

The buffer controller is shown in greater specificity in the block diagram of FIG. 3 and includes a plurality of bi-directional shift registers (BSRs) 60 for storing the paired sets of age and slot number, each BSR having a slot control circuit (SCC) 62 for controlling the flow of data from the BSR 60 onto a contention bus pair 64 which compares the ages and, if necessary, the slot numbers to determine the proper data packet which is next eligible for transmission. A timing generator 66 provides a variety of control signals at appropriate moments in the controllet's operational cycle, including signals which cause the age values stored in the BSRs 60 to be incremented. An output circuit 68 compares the winning data packet age with an age threshold and controls the transmission of data packets from the resequencing buffer 44.

Figure 5:
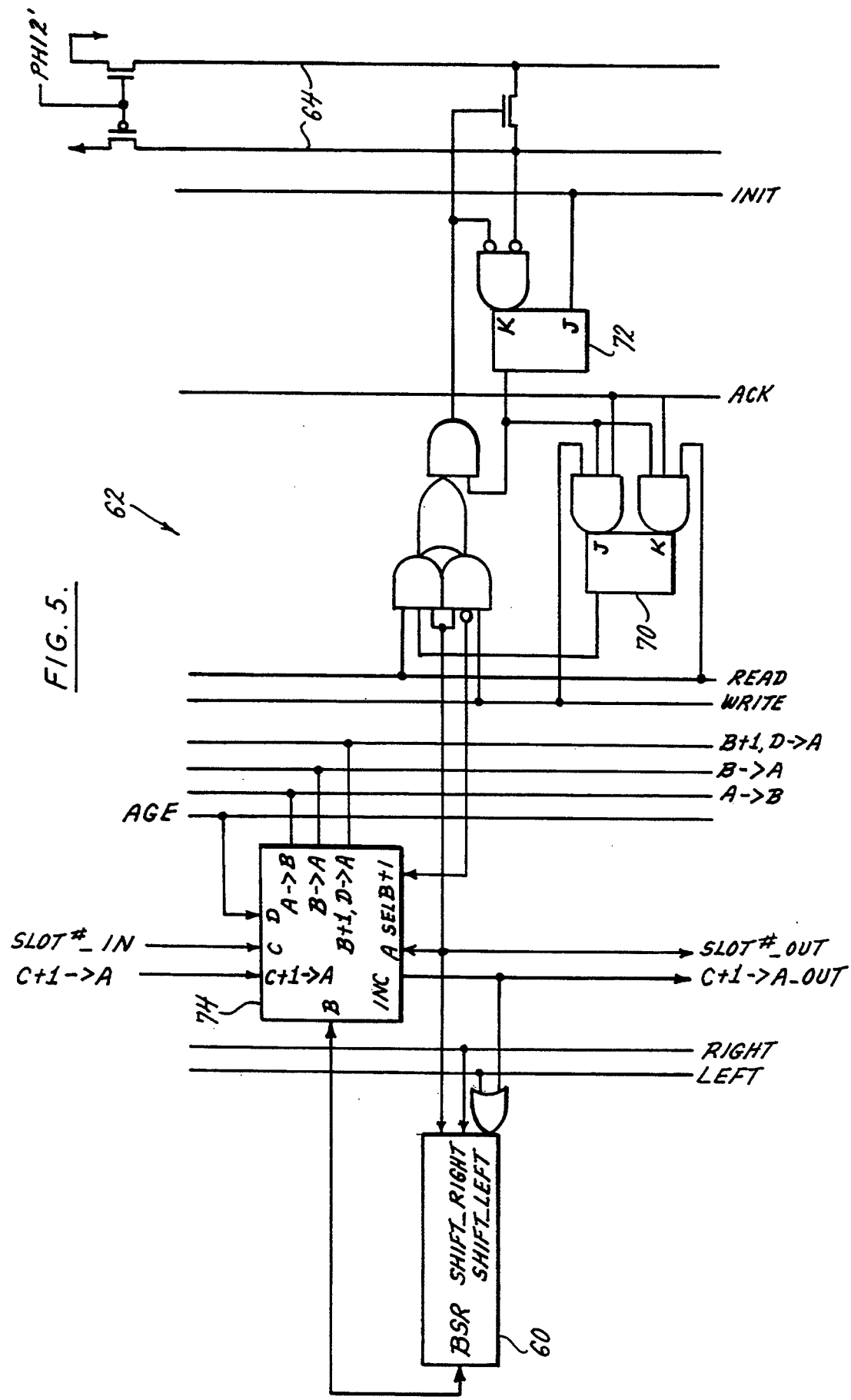
FIG. 5 is a block diagram of a slot control circuit.
Figure 6:
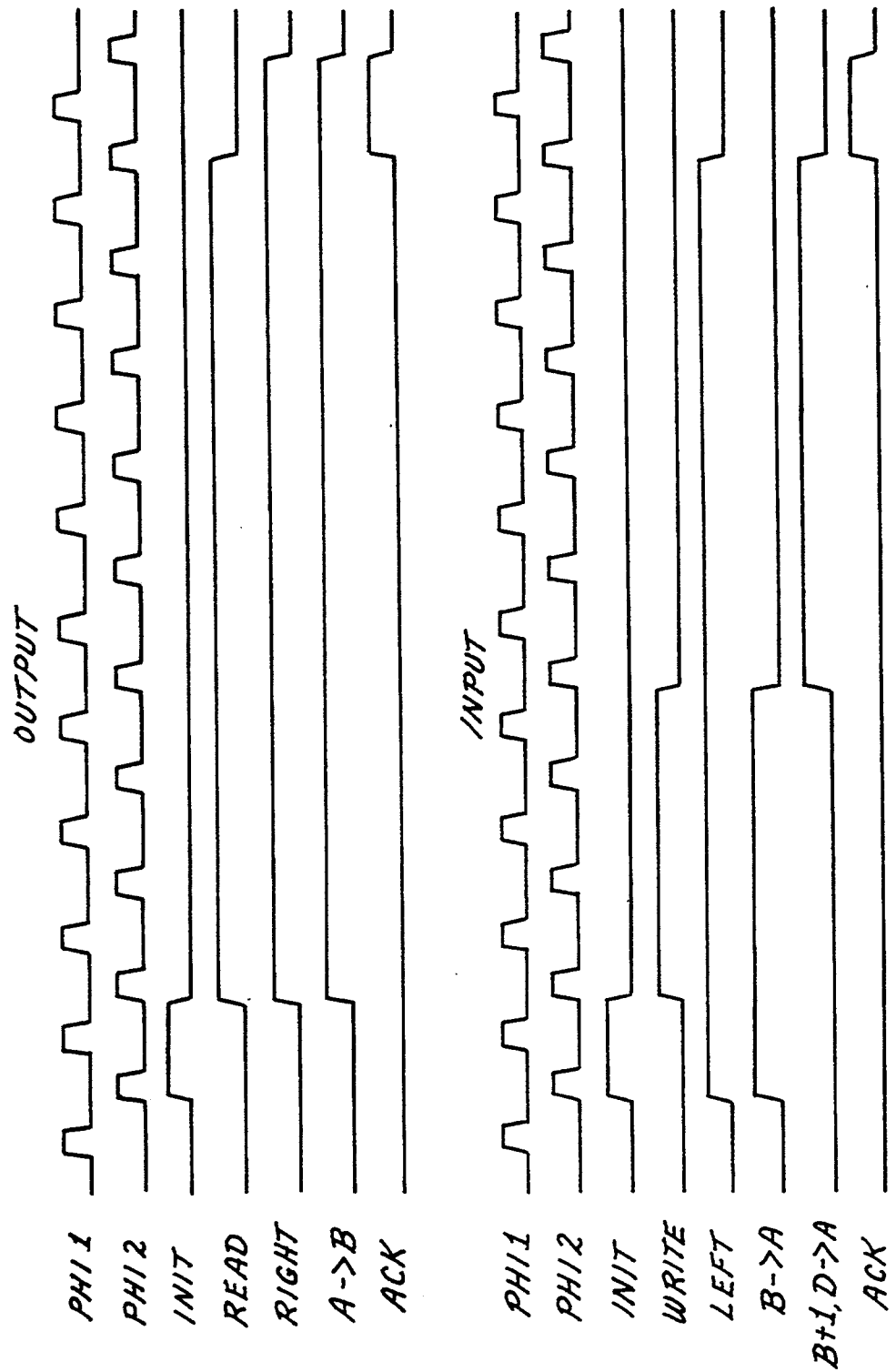
FIG. 6 is a timing diagram for the slot control circuit.

Further detail concerning the operation of the slot control circuit 62 can be best explained by referring to FIG. 5. As shown therein, the SCC 62 includes a data present flip-flop 70 which is set if a data packet is stored in the buffer slot associated with the particular SCC 62 and BSR 60 shown in FIG. 5. A second flip-flop 72, called a contention flip-flop, is set when the slot control circuit 62 is contending for the contention bus 64. An incrementer 74 includes a serial incrementer plus signal steering circuitry to pass signals between different pairs of its serial data ports A, B, C and D. For example, when the control signal A→B is asserted, data on the A port is passed to the B port with a one clock delay. When the control signal B+1, D→A is asserted and sel B+1 is asserted, the data on the B port is incremented and passed to the A port with a one tick delay with the data assumed to come in least significant bit first. If sel B+i is not asserted, the data on port D is passed to port A with a one tick delay. The BSR 60 contains the number of the buffer slot managed by this control slot at its left end and the age for the stored data packet with the age's most significant bit at the right end of the shift register. During a buffer read cycle, the BSR is shifted to the right allowing the age and slot number to pass to the contention bus 64 while at the same time the BSR contents are recirculated back into the BSR through the incrementer 74. During a buffer write cycle, the BSR 60 is shifted to the left and the slot number passes through the incrementer 74 to the contention bus 64. When the age arrives at the incrementer 74 however, the incrementer 74 either increments its value (if the data present flip flop is set) or reads in the age of a newly arriving data packet (if the data present flip flop is not set). More detailed operation of the circuit is illustrated in the timing diagram of FIG. 6 which shows the control signals required for a read and write cycle in a case where the slot number is three bits long and the time stamp (age) is five bits long.

Initialization of the SCC 62 is achieved by using the slot number in and C+1→A signals The incoming slot number is incremented and passed to the BSR and the next SCC. The C+1→A signal is used to time the incrementing and is then delayed by one clock tick to control the shifting of the slot number into the BSR 60 and is then passed to the next SCC in sequence.

The wire OR contention bus permits a plurality of bits to be simultaneously compared and contend for control thereof. As a slot is compared and it loses, further contention is inhibited by the contention flip-flip 72. Thus, the individual slots are compared throughout their plurality of age bits until a winner is chosen. If there is a tie between two or more data packets, the SCC 62 outputs the slot numbers so that any ties may be reliably broken and a single data packet be chosen as eligible for transmission.

In a realistic application, the resequencing buffer controlled by the resequencing buffer control circuit might have 256 slots and each slot may store a data packet age of perhaps 10 bits in length In this configuration, each BSR would be 18 bits long, requiring 220 transistors. The inventor estimates that the slot control circuit would require about 130 transistors bringing the total transistors required for each buffer to about 350. Since a typical data packet in an ATM network is 424 bits long, and a typical static memory cell is six transistors, this represents about 15% of the total transistor count required for the memory itself. Since the area per transistor of the control circuitry will undoubtedly be larger than that for the memory cells, the inventor estimates that the chip area consumed by the control circuitry will be about 25% of that consumed by the memory. Therefore, with the methodology and apparatus of the present invention, a reasonable buffer controller can be achieved with a complexity of no more than 25% of the buffer itself.

Figure 7:
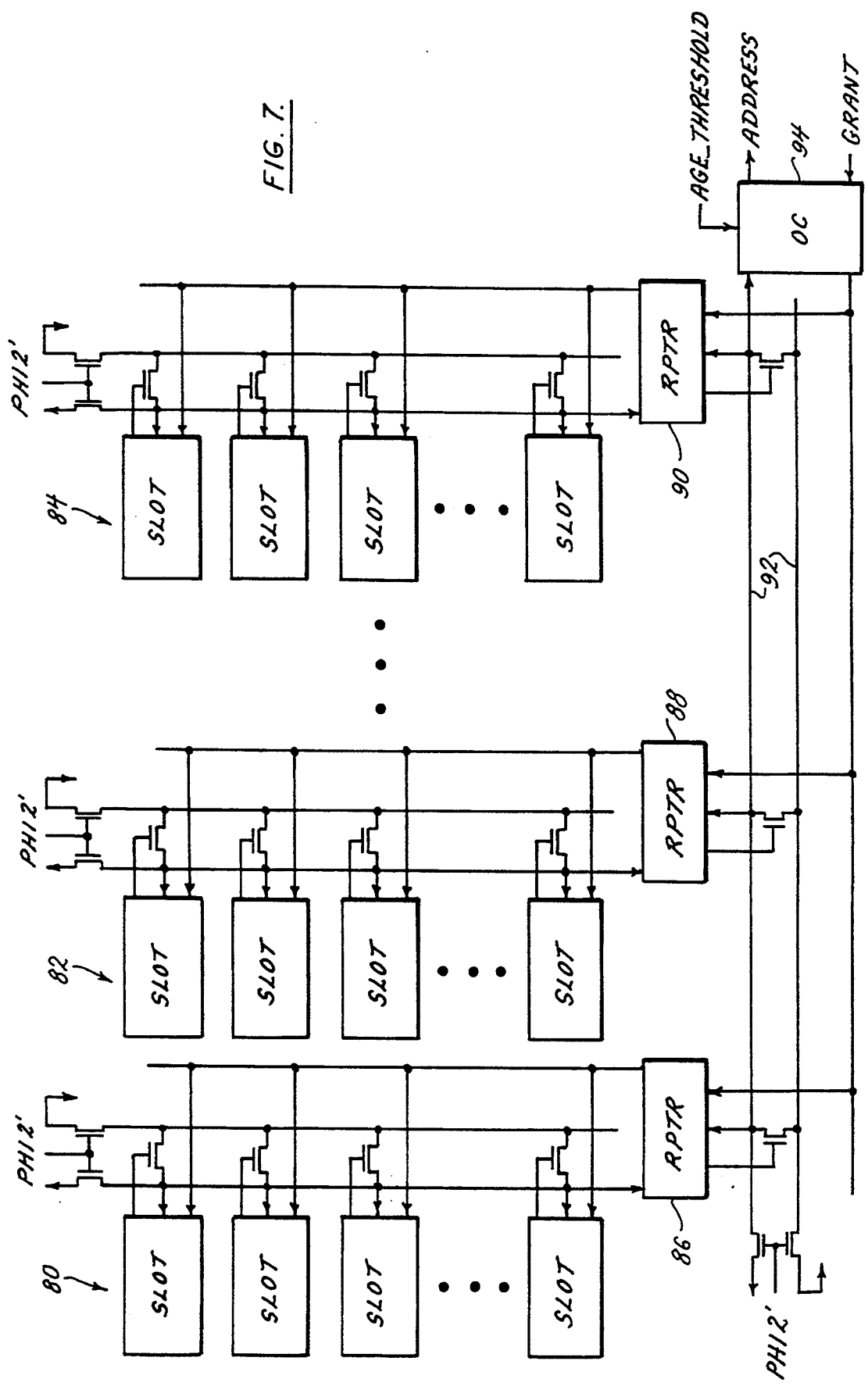
FIG. 7 is a block diagram of a plurality of buffer controllers cascaded onto a single contention bus.

In a large buffer, a single level contention bus as described above would operate only at a somewhat lower speed and can provide a bottleneck due to the capacitive loading placed on the contention bus by the number of slot control circuits. Operation can be speeded up by grouping the slot control circuits into groups of perhaps 16 or the like and then cascading these groupings onto a global contention bus. Such an arrangement is shown in FIG. 7 and includes groupings 80, 82, 84 of BSRs and their associated contention buses connected to repeaters 86, 88, 90 which then output the winning age and slot number data onto a global contention bus 92 connected to an output circuit 94. This cascading of groupings 80, 82, 84 greatly diminishes the effects of capacitive loading and permits the overall buffer control circuit to operate at speeds more than fast enough to handle the data rates required in any typical high speed data net-work.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a high speed data packet switch having means for routing a plurality of data packets between a plurality of inputs and a plurality of outputs, said routing means being indifferent to any sequence of said data packets so that data packets routed therethrough are permitted to appear at said plurality of outputs in a sequence different from the sequence of said data packets at said plurality of inputs, the improvement comprising means for resequencing said data packets at said plurality of outputs into the same sequence as said data packets were in as said plurality of inputs, said resequencing means including means for placing said data packets into the same sequence determined by the time each of said data packets was received at said plurality of inputs, a buffer associated with each of said outputs for receiving and storing a plurality of data packets therefrom, and means for determining the age of said stored data packets, the means for determining the age of said data packets comprising means for time stamping said data packets with an entry time as they arrive at said inputs and means for comparing said entry time with an exit time as said data packets arrive at said buffers, the difference between said entry time and said exit time being defined as the present age of said data packets.

2. The device of claim 1 wherein said re-sequencing means further comprises a buffer controller associated with each buffer for controlling the output of data packets from its associated buffer.

3. In a high speed data packet switch having means for routing a plurality of data packets between a plurality of inputs and a plurality of outputs, the improvement comprising means connected to the switch outputs for storing said data packets as they exit said switch outputs, means for determining the sequence in time said data packets first appeared at said switch inputs, means for determining an age for each of said stored data packets, said age corresponding to the difference between a data packet switch entry time and the then present time, and means for retransmitting said data packets in said same time sequence from said storing means by selecting for output first those data packets having the oldest age.

* * * * *